US012649243B2

(12) United States Patent
Lee et al.

(10) Patent No.: US 12,649,243 B2
(45) Date of Patent: Jun. 9, 2026

(54) WORKING ROBOT OPERATING SYSTEM AND METHOD

(71) Applicants: HYUNDAI MOTOR COMPANY, Seoul (KR); KIA CORPORATION, Seoul (KR)

(72) Inventors: Seong Sul Lee, Gunpo-si (KR); Yeon Woo Song, Seoul (KR); Seung Ho Lee, Incheon (KR); Sun Hoon Kim, Seoul (KR); Yoon Soo Kim, Suwon-si (KR); Dae Won Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 197 days.

(21) Appl. No.: 18/416,621

(22) Filed: Jan. 18, 2024

(65) Prior Publication Data

US 2025/0058476 A1      Feb. 20, 2025

(30) Foreign Application Priority Data

Aug. 18, 2023     (KR) ........................ 10-2023-0108445

(51) Int. Cl.
*B25J 9/16* (2006.01)
*B25J 9/00* (2006.01)
*B25J 11/00* (2006.01)

(52) U.S. Cl.
CPC ........... *B25J 11/005* (2013.01); *B25J 9/0084* (2013.01); *B25J 9/1661* (2013.01)

(58) Field of Classification Search
CPC ....... B25J 11/005; B25J 9/0084; B25J 9/1661
See application file for complete search history.

(56) References Cited

U.S. PATENT DOCUMENTS

| | | | | |
|---|---|---|---|---|
| 10,144,126 | B2 * | 12/2018 | Krohne | ................. B25J 9/0084 |
| 11,027,427 | B2 * | 6/2021 | Diankov | ................ B25J 9/1697 |
| 11,529,741 | B2 * | 12/2022 | Rawas | .................. B25J 9/0087 |
| 12,280,554 | B2 * | 4/2025 | Czinger | ................. B25J 11/005 |
| 12,314,036 | B2 * | 5/2025 | Derecichei | ....... G05B 19/41805 |

* cited by examiner

*Primary Examiner* — Dalena Tran
(74) *Attorney, Agent, or Firm* — Lempia Summerfield Katz LLC

(57) ABSTRACT

A working robot operating system and method are provided. The system includes a plurality of working robots each configured to perform a work process involving deterioration of a working part and a repair process of repairing the deterioration of the working part. The system also includes a control device configured to determine an existing performance schedule in which the repair process of each of the plurality of working robots is performed based on production information of a product and specification information of a working part for each working robot. The control device is also configured to determine an optimal performance schedule of the repair process for each of the plurality of working robots based on the determined existing performance schedule, and to control the plurality of working robots so that the repair process is performed by following the determined optimal performance schedule.

18 Claims, 17 Drawing Sheets

FIG. 2

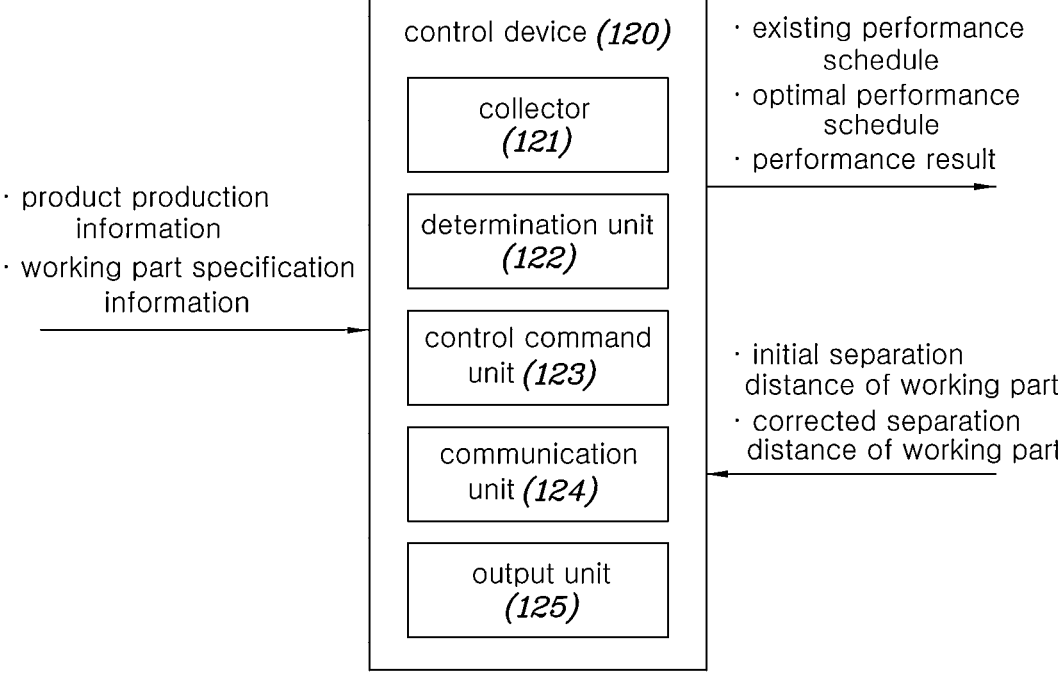

· product production
information
· working part specification
information control device *(120)* collector
*(121)* determination unit
*(122)* control command
unit *(123)* communication
unit *(124)* output unit
*(125)*

· existing performance
schedule
· optimal performance
schedule
· performance result · initial separation
distance of working part
· corrected separation
distance of working part

FIG. 4

| working robot | working part specification | workload per time | maximum workload | performance cycle |
|---|---|---|---|---|
| A | 13Φ | 20 | 150 | one time/7 |
| B | 13Φ | 15 | 150 | one time/10 |
| C | 16Φ | 10 | 250 | one time/25 |
| D | 16Φ | 5 | 250 | one time/50 |

FIG. 5

| | a | b | c | d | e | f | g | h | i | j |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 1 | 0 | 0 | 0 | 0 | 0 |
| 9 | 0 | 1 | 0 | 0 | 0 | 0 | 0 | 0 | 0 | 0 |
| 10 | 0 | 0 | 0 | 0 | 0 | 0 | 0 | 0 | 0 | 0 |
| 11 | 0 | 0 | 0 | 0 | 0 | 0 | 1 | 0 | 0 | 0 |
| 12 | 0 | 0 | 0 | 0 | 0 | 0 | 0 | 1 | 0 | 0 |
| 13 | 0 | 0 | 0 | 0 | 0 | 0 | 0 | 0 | 0 | 0 |
| 14 | 0 | 0 | 1 | 0 | 0 | 0 | 0 | 0 | 0 | 0 |
| 15 | 0 | 0 | 0 | 1 | 0 | 0 | 0 | 0 | 0 | 1 |
| 16 | 0 | 0 | 0 | 0 | 0 | 1 | 0 | 0 | 0 | 0 |
| 17 | 1 | 0 | 0 | 0 | 0 | 0 | 0 | 0 | 0 | 0 |
| 18 | 0 | 0 | 0 | 0 | 0 | 0 | 0 | 0 | 1 | 0 |

FIG. 6

| | a | b | c | d | e | f | g | h | i | j |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | ● | 0 | 0 | 0 | 0 | 0 | 0 | 0 | 0 |
| 6 | 0 | 0 | 0 | 0 | ▲ | 0 | 0 | 0 | 0 | 0 |
| 7 | 0 | 0 | 0 | 0 | 0 | 0 | ● | 0 | 0 | 0 |
| 8 | 0 | 0 | 0 | 0 | 1 | 0 | 0 | 0 | 0 | 0 |
| 9 | 0 | 1 | 0 | 0 | 0 | 0 | 0 | ▲ | 0 | 0 |
| 10 | 0 | 0 | 0 | 0 | 0 | 0 | 0 | 0 | 0 | 0 |
| 11 | 0 | 0 | ▲ | 0 | 0 | 0 | 1 | 0 | 0 | 0 |
| 12 | 0 | 0 | 0 | ▲ | 0 | ● | 0 | 1 | 0 | ▲ |
| 13 | ● | 0 | 0 | 0 | 0 | 0 | 0 | 0 | 0 | 0 |
| 14 | 0 | 0 | 1 | 0 | 0 | 0 | 0 | 0 | ● | 0 |
| 15 | 0 | 0 | 0 | 1 | 0 | 0 | 0 | 0 | 0 | 1 |
| 16 | 0 | 0 | 0 | 0 | 0 | 1 | 0 | 0 | 0 | 0 |
| 17 | 1 | 0 | 0 | 0 | 0 | 0 | 0 | 0 | 0 | 0 |
| 18 | 0 | 0 | 0 | 0 | 0 | 0 | 0 | 0 | 1 | 0 |

| | a | b | c | d | e | f | g | h | i | j | total |
|---|---|---|---|---|---|---|---|---|---|---|---|
| 0 | | | | | | | | | | | 0 |
| 1 | | | | | | | | | | | 0 |
| 2 | | | | | | | | | | | 0 |
| 3 | | | | | | | | | | | 0 |
| 4 | | | | | | | | | | | 0 |
| 5 | | 0 | | | | | | | | | 0 |
| 6 | | 1 | | 0 | | | | | | | 1 |
| 7 | | 2 | | 1 | | 0 | | | | | 3 |
| 8 | | 3 | | 0 | | 1 | 0 | | | | 6 |
| 9 | | 4 | | | | 2 | 1 | | | | 7 |

FIG. 10

| working robot | simulation result | | | | |
|---|---|---|---|---|---|
| | N=3 | N=4 | N=5 | N=6 | N=6 |
| 1) number of working robots each performing repair process (140times↑/70times↑) | 0/7 | 2/14 | 0/8 | 0/12 | 0/20 |
| 2) number of delays | 202 | 155 | 134 | 119 | 105 |
| 3) number of total repair processes performed | 3056 | 3241 | 3236 | 3308 | 3528 |

FIG. 11

|    | a | b | c | d | e | f | g | h | i | j |
|----|---|---|---|---|---|---|---|---|---|---|
| 0  | 0 | 0 | 0 | 0 | 0 | 0 | 0 | 0 | 0 | 0 |
| 1  | 0 | 0 | 0 | 0 | 0 | 0 | 0 | 0 | 0 | 0 |
| 2  | 0 | 0 | 0 | 0 | 0 | 0 | 0 | 0 | 0 | 0 |
| 3  | 0 | 0 | 0 | 0 | 0 | 0 | 0 | 0 | 0 | 0 |
| 4  | 0 | 0 | 0 | 0 | 0 | 0 | 0 | 0 | 0 | 0 |
| 5  | 0 | 0 | 0 | 0 | 0 | 0 | 0 | 0 | 0 | 0 |
| 6  | 0 | 0 | 0 | 0 | 0 | 0 | 0 | 0 | 0 | 0 |
| 7  | 0 | 0 | 0 | 0 | 0 | 0 | 0 | 0 | 0 | 0 |
| 8  | 0 | 0 | 0 | 0 | 0 | 0 | 0 | 0 | 0 | 0 |
| 9  | 0 | 0 | 0 | 0 | 0 | 0 | 0 | 0 | 0 | 0 |
| 10 | 0 | 0 | 0 | 0 | 0 | 0 | 0 | 0 | 0 | 0 |
| 11 | 0 | 0 | 0 | 0 | 0 | 0 | 0 | 0 | 0 | 0 |
| 12 | 0 | 0 | 0 | 0 | 0 | 0 | 2 | 0 | 0 | 0 |
| 13 | 0 | 0 | 0 | 0 | 0 | 0 | 0 | 0 | 0 | 0 |
| 14 | 2 | 2 | 0 | 0 | 0 | 0 | 0 | 0 | 2 | 2 |
| 15 | 0 | 0 | 0 | 0 | 0 | 0 | 0 | 2 | 0 | 0 |
| 16 | 0 | 0 | 0 | 0 | 0 | 0 | 0 | 0 | 0 | 0 |
| 17 | 0 | 0 | 0 | 0 | 0 | 0 | 0 | 0 | 0 | 0 |
| 18 | 0 | 0 | 0 | 0 | 0 | 0 | 0 | 0 | 0 | 0 |
| 19 | 0 | 0 | 2 | 2 | 0 | 0 | 0 | 0 | 0 | 0 |
| 20 | 0 | 0 | 0 | 0 | 0 | 0 | 0 | 0 | 0 | 0 |
| 21 | 0 | 0 | 0 | 0 | 0 | 0 | 0 | 0 | 0 | 0 |
| 22 | 0 | 0 | 0 | 0 | 0 | 0 | 0 | 0 | 0 | 0 |
| 23 | 0 | 0 | 0 | 0 | 0 | 0 | 0 | 0 | 0 | 0 |
| 24 | 0 | 0 | 0 | 0 | 0 | 0 | 0 | 0 | 0 | 0 |
| 25 | 0 | 0 | 0 | 0 | 0 | 0 | 2 | 0 | 0 | 0 |
| 26 | 0 | 0 | 0 | 0 | 0 | 0 | 0 | 0 | 0 | 0 |
| 27 | 0 | 0 | 0 | 0 | 0 | 0 | 0 | 0 | 0 | 0 |
| 28 | 2 | 2 | 0 | 0 | 0 | 0 | 0 | 0 | 2 | 2 |
| 29 | 0 | 0 | 0 | 0 | 0 | 0 | 0 | 0 | 0 | 0 |
| 30 | 0 | 0 | 0 | 0 | 0 | 0 | 0 | 0 | 0 | 0 |

FIG. 12

| | a | b | c | d | e | f | g | h | i | j |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 2 | 2 | 0 | 0 | 0 | 0 | 2 | 2 | 2 | 2 |
| 10 | 0 | 0 | 0 | 0 | 0 | 0 | 0 | 0 | 0 | 0 |
| 11 | 0 | 0 | 0 | 0 | 0 | 0 | 0 | 0 | 0 | 0 |
| 12 | 0 | 0 | 0 | 0 | 0 | 0 | 0 | 0 | 0 | 0 |
| 13 | 0 | 0 | 0 | 0 | 0 | 0 | 0 | 0 | 0 | 0 |
| 14 | 0 | 0 | 0 | 0 | 0 | 0 | 0 | 0 | 0 | 0 |
| 15 | 0 | 0 | 0 | 0 | 0 | 0 | 0 | 0 | 0 | 0 |
| 16 | 0 | 0 | 0 | 0 | 0 | 0 | 0 | 0 | 0 | 0 |
| 17 | 2 | 2 | 2 | 2 | 0 | 0 | 2 | 2 | 2 | 2 |
| 18 | 0 | 0 | 0 | 0 | 0 | 0 | 0 | 0 | 0 | 0 |
| 19 | 0 | 0 | 0 | 0 | 0 | 0 | 0 | 0 | 0 | 0 |
| 20 | 0 | 0 | 0 | 0 | 0 | 0 | 0 | 0 | 0 | 0 |
| 21 | 0 | 0 | 0 | 0 | 0 | 0 | 0 | 0 | 0 | 0 |
| 22 | 0 | 0 | 0 | 0 | 0 | 0 | 0 | 0 | 0 | 0 |
| 23 | 0 | 0 | 0 | 0 | 0 | 0 | 0 | 0 | 0 | 0 |
| 24 | 0 | 0 | 0 | 0 | 0 | 0 | 0 | 0 | 0 | 0 |
| 25 | 2 | 2 | 0 | 0 | 0 | 0 | 2 | 0 | 2 | 2 |
| 26 | 0 | 0 | 0 | 0 | 0 | 0 | 0 | 0 | 0 | 0 |
| 27 | 0 | 0 | 0 | 0 | 0 | 0 | 0 | 0 | 0 | 0 |
| 28 | 0 | 0 | 0 | 0 | 0 | 0 | 0 | 0 | 0 | 0 |
| 29 | 0 | 0 | 0 | 0 | 0 | 0 | 0 | 0 | 0 | 0 |
| 30 | 0 | 0 | 0 | 0 | 0 | 0 | 0 | 0 | 0 | 0 |

FIG. 13

| repair process performance method | number of delays in entire process | total number of repair processes performed by working robot | number of working parts used (per day) |
|---|---|---|---|
| existing performance schedule | 716 times | 2,850 times | 71 |
| conventional collective performance (8/one time) | 105 times (= 840 ÷ 8) | 6,825 times (= 105 times × 65) | 130 (= 65 × 2) |
| optimal performance schedule | 134 times | 3236 times | 73 |

20

WORKING ROBOT OPERATING SYSTEM AND METHOD

CROSS-REFERENCE TO THE RELATED APPLICATION

This application claims the benefit of and priority to Korean Patent Application No. 10-2023-0108445, filed on Aug. 18, 2023, in the Korean Intellectual Property Office, the entire disclosure of which is incorporated herein by reference.

TECHNICAL FIELD

The present disclosure relates to a working robot operating system and method for performing a control operation so that a working robot performs a specific process.

BACKGROUND

Recently, with automation of factories producing vehicles, working robots have been used to perform process-specific tasks. For example, welding work (for example, spot welding) that is typically performed to produce a vehicle body in a Body-In-White (BIW) process may be performed by a working robot.

A working robot may be equipped with a welding gun. The welding gun may be equipped with a welding tip including an upper tip and a lower tip. When welding work is performed by the working robot, the working robot positions the upper tip and the lower tip at locations where the welding work is to be performed on a panel included in the car body. The working robot then applies strong electricity for a short period of time, so that resistance heat generated when electricity is applied may cause the panel to be melted and joined.

Generally, when welding work is performed using the working robot, it is desirable to maintain constant welding quality due to the welding work. The welding quality may be determined by a current value flowing between the upper tip and the lower tip of the welding tip mounted on the working robot. Accordingly, in order to keep the current value flowing between the upper tip and the lower tip constant, cutting work, such as Auto Tip Dressing (ATD), or replacement work may be periodically performed on the upper tip and the lower tip.

However, because timing of cutting work or replacement work may vary depending on the size and material of the upper tip and the lower tip and the target vehicle on which the welding work is being performed, and further because a typical factory is equipped with a large number of working robots, it may be difficult to regularly manage the timing of the cutting work or the replacement work.

Accordingly, in the case where a plurality of working robots is provided, increase in management convenience has been attempted by simultaneously performing the cutting work or the replacement work on the plurality of working robots, or by individually performing the cutting work or the replacement work using a separate controller corresponding to each of the plurality of working robots.

However, when the cutting work or the replacement work is performed on the plurality of working robots at the same time, a welding tip of a working robot performing less welding work is replaced. Thus, there is a problem in that welding tips are not properly used and cutting work or replacement work is frequently performed, resulting in waste of welding tips.

When each of the plurality of working robots individually performs the cutting work or the replacement work, welding tips may be prevented from being wasted. However, due to cutting work or replacement work of any one working robot, a process handled by the working robot may be delayed. When such delay occurs in succession, there is a problem in that an overall cycle time is delayed and thus productivity is reduced.

The subject matter described in this Background section is only intended to enhance understanding of the background of the present disclosure. Therefore, the Background section may contain information that does not form prior art that is already known to those having ordinary skill in the art to which the present disclosure pertains.

SUMMARY

Therefore, the present disclosure has been made in view of the above problems. The present disclosure provides a working robot operating system and method capable of preventing waste of necessary members when a process is performed and preventing delay in an overall cycle time of the process.

The technical problems to be achieved in the present disclosure are not limited to the technical problems mentioned above. Other technical problems not mentioned here may be more clearly understood by those having ordinary skill in the art to which the present disclosure pertains based on the description below.

In accordance with an aspect of the present disclosure, a working robot operating system is provided. The working robot operating system includes a plurality of working robots each configured to perform a work process involving deterioration of a working part and a repair process of repairing the deterioration of the working part. The working robot operating system also includes a control device configured to determine an existing performance schedule in which the repair process of each of the plurality of working robots is performed based on production information of a product and specification information of a working part for each working robot. The control device is also configured to determine an optimal performance schedule of the repair process for each of the plurality of working robots based on the determined existing performance schedule. The control device is further configured to control the plurality of working robots so that the repair process is performed by following the determined optimal performance schedule.

The control device may be configured to determine a performance cycle of the repair process based on the production information and the specification information. The control device may also be configured to determine the existing performance schedule based on the determined performance cycle.

The control device may be configured to determine a workload per time and a maximum workload for each working robot based on the production information and the specification information. The control device may also be configured to determine the performance cycle based on the determined workload per time and maximum workload for each working robot.

The control device may be configured to perform a control operation so that each of the plurality of working robots performs the repair process based on the determined existing performance schedule. The control device may also be configured to determine whether the work process is delayed for each product for each of the plurality of working robots based on a performance result of the repair process performed by each of the plurality of working robots. The control device may additionally be configured to determine the optimal performance schedule based on an existing performance schedule of at least one working robot, the work process of which is determined to be delayed, among the plurality of working robots.

The control device may be configured to classify the plurality of working robots into a group in which no delay occurs for each product, a group in which delays occur in some products, and a group in which delays occur in all products based on the determination as to whether the work process is delayed. The control device may also be configured to determine the optimal performance schedule based on an existing performance schedule of at least one working robot classified as the group in which delays occur in some products or the group in which delays occur in all products among the classified groups.

The control device may be configured to determine a performance time point of the repair process of the at least one working robot based on the existing performance schedule. The control device may also be configured to determine a candidate sequence range for the at least one working robot based on a cycle adjustment value preset so that the determined performance time point is included at a last sequence position. The control device may additionally be configured to determine the optimal performance schedule based on the determined candidate sequence range.

The control device may be configured to determine whether the work process is delayed in each of candidate sequence positions included in the candidate sequence range. The control device may also be configured to classify the determined candidate sequence range into a first case where delays occur in all the candidate sequence positions and a second case where there is a candidate sequence position at which no delay occurs. The control device may further be configured to determine the optimal performance schedule based on a candidate sequence range having an earliest sequence position among candidate sequence ranges classified as the first case.

The control device may be configured to determine a reference point serving as a criterion for sequence score calculation for each of candidate sequence ranges classified as the first case and the second case. The control device may also be configured to calculate a sequence score for each sequence position based on the candidate sequence range having the earliest sequence position. The control device may additionally be configured to determine a time point corresponding to a sequence position having a highest sequence score among calculated sequence scores as an optimal performance time point. The control device may further be configured to determine the optimal performance schedule based on the determined optimal performance time point.

The control device may be configured to, after the optimal performance time point is determined, determine a next optimal performance time point based on a candidate sequence range having a next earliest sequence position among the candidate sequence ranges classified as the first case.

The control device may be configured to, for a candidate sequence range present before the determined optimal performance time point in the first case and the second case, determine a reference point of the candidate sequence range as the optimal performance time point.

The control device may be configured to receive process performance information obtained by performance of the plurality of working robots following the optimal performance schedule. The control device may also be configured to determine a process performance result based on the received process performance information and cause the process performance result to be output.

The control device may be configured to determine a process performance result including at least one of information on a quantity of the repair process of the working part or information as to whether repair of the working part is defective based on the process performance information.

The control device may be configured to store the determined optimal performance schedule. The control device may also be configured to determine whether the production information has changed. The control device may be configured to control the plurality of working robots so that the repair process is performed by following the stored optimal performance schedule when the production information has not changed.

The control device may be configured to update the stored optimal performance schedule in consideration of changed production information when the production information is changed. The control device may also be configured to control the plurality of working robots so that the repair process is performed by following the updated optimal performance schedule.

The control device may be a programmable logic controller (PLC) configured to control the plurality of working robots.

The control device may include a respective counter provided to correspond to each of the plurality of working robots. The control device may also include a control panel configured to control a working robot by receiving a signal from a corresponding counter.

The working part may include a welding tip. The work process may be a welding process. The repair process may be an auto tip dressing (ATD) process.

In accordance with another aspect of the present disclosure, a working robot operating method is provided. The working robot operating method includes determining, by a control device, an existing performance schedule in which a repair process of repairing deterioration of a working part of each of a plurality of working robots is performed based on production information of a product and specification information of a working part for each working robot. The working robot operating method also includes determining, by the control device, an optimal performance schedule of the repair process for each of the plurality of working robots based on the determined existing performance schedule. The working robot operating method further includes controlling, by the control device, the plurality of working robots so that the repair process is performed by following the determined optimal performance schedule.

The working robot operating method may further include determining, by the control device, a process performance result including at least one of information on a quantity of the repair process of the working part and information as to whether repair of the working part is defective based on process performance information obtained by performance of the plurality of working robots following the optimal performance schedule after the controlling. The working robot operating method may additionally include outputting, by the control device, the process performance result.

BRIEF DESCRIPTION OF THE DRAWINGS

The above and other objects, features, and other advantages of the present disclosure should be more clearly understood from the following detailed description taken in conjunction with the accompanying drawings, in which:

FIG. 2 is a block diagram of an operation of a control device, according to an embodiment of the present disclosure;

FIGS. 4-10 are tables for describing a process of determining an optimal performance schedule in a control device, according to an embodiment of the present disclosure;

FIGS. 11-13 are diagrams for describing an effect obtained when a process is performed so that a working robot follows the optimal performance schedule, according to an embodiment of the present disclosure;

DETAILED DESCRIPTION

Figure 1:
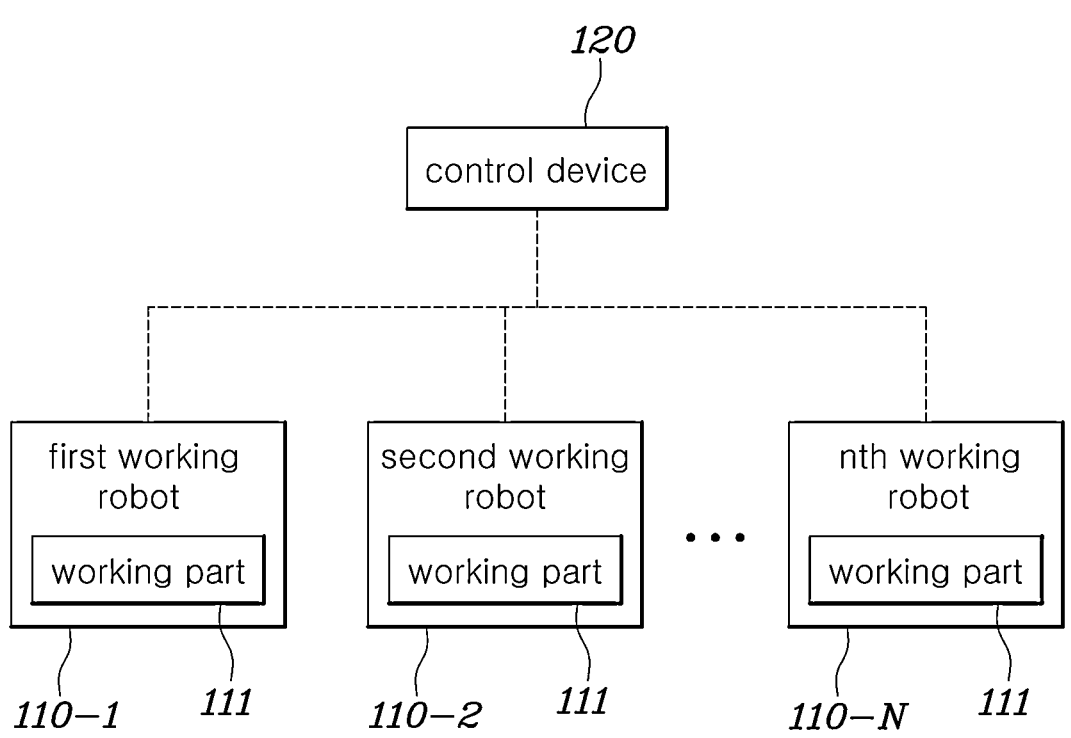
FIG. 1 is a block diagram of a working robot operating system, according to an embodiment of the present disclosure.

In describing embodiments disclosed in the present specification, where it has been determined that a detailed description of related well-known technologies, configurations, functions, or components may obscure the gist of the embodiments disclosed in the present specification, the detailed description thereof has been omitted. In addition, the accompanying drawings are only to enhance understanding of the embodiments disclosed in this specification. The technical idea of the present disclosure is not limited by the accompanying drawings. Further, it should be understood that the present disclosure encompasses all changes, equivalents, and substitutes included in the spirit and technical scope of the present disclosure.

Although terms including ordinal numbers, such as "first", "second", etc., may be used herein to describe various elements, the elements are not limited by these terms. These terms are generally only used to distinguish one element from another.

Terms such as "~unit", "~module", and the like may denote a unit for performing at least one function or operation. For example, the terms may refer to at least one hardware component such as a field-programmable gate array (FPGA) or an application specific integrated circuit (ASIC), at least one software stored in a memory, or at least one process performed by a processor.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that terms such as "include" or "have" or variations thereof are intended to designate that the features, numbers, steps, operations, elements, parts, or combinations thereof described in the specification are present. Such terms do not preclude the possibility of presence or addition of one or more other features, numbers, steps, operations, elements, parts, or combinations thereof.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings. In the accompanying drawings and the following description, the same or similar elements are designated with the same reference numerals regardless of reference symbols and redundant descriptions thereof have been omitted.

Before describing embodiments of the present disclosure, it is noted that an object of the present disclosure is to prevent waste of necessary members when a working robot performs a work process in which a working part such as a welding tip or a cutting tip deteriorates or is consumed, and to prevent a cycle time of the entire process from being delayed due to repair of deterioration. Hereinafter, it is assumed that the work process is a welding process and that the working robot is a welding robot that performs the welding process. However, this is for convenience of description and the embodiments of the present disclosure are not limited to the work process or the type of robot.

First, a working robot operating system according to an embodiment of the present disclosure is described with reference to FIG. 1.

FIG. 1 is a block diagram of a working robot operating system, according to the embodiment of the present disclosure.

Referring to FIG. 1, the working robot operating system according to the embodiment of the present disclosure may include a plurality of working robots 110-1, 110-2, ..., 110-N and a control device 120. FIG. 1 mainly illustrates components related to the embodiment of the present disclosure. The working robot operating system may actually include fewer or more components than the illustrated components.

In addition, to perform an assigned function, each of the plurality of working robots 110-1, 110-2, ..., 110-N and the control device 120 may include a communication device configured to communicate with another device (for example, a controller or a sensor), a memory configured to store an operating system or logic instructions and input/output information, and one or more processors configured to perform determinations, operations, and decisions necessary to control the assigned function.

The plurality of working robots 110-1, 110-2, ..., 110-N according to the embodiment of the present disclosure may each include a working part 111. In addition, the plurality of working robots 110-1, 110-2, ..., 110-N may each perform a work process involving deterioration of the working part 111 and a repair process of repairing deterioration of the working part 111.

According to the above-described assumption, the plurality of working robots 110-1, 110-2, ..., 110-N according to the embodiment of the present disclosure may be welding robots. Accordingly, the corresponding working part 111 may be a welding tip provided for welding work. The work process involving deterioration of the working part 111 may refer to a process of performing welding work. The repair process of repairing deterioration of the working part 111 may refer to a process of performing cutting work of the welding tip (for example, auto tip dressing (ATD)) or replacement work.

However, this is an example and the present disclosure is not necessarily limited thereto.

The control device 120 may be equipped to communicate with the plurality of working robots 110-1, 110-2, . . . , 110-N. The control device 120 may control each of the plurality of working robots 110-1, 110-2, . . . , 110-N. A specific operation performed by the control device 120, according to an embodiment, is described in more detail below with reference to FIG. 2.

FIG. 2 is a block diagram of an operation of the control device, according to an embodiment of the present disclosure.

Referring to FIG. 2, the control device 120 according to the embodiment of the present disclosure may include a collector 121, a determination unit 122, a control command unit 123, a communication unit 124, and an output unit 125. FIG. 2 mainly illustrates components related to the embodiment of the present disclosure. The control device 120 may actually include fewer or more components than the illustrated components.

The collector 121 may collect production information of a product and specification information of the working part 111 for each working robot. The production information of the product may be information on at least one of a type of product to be produced, specifications of the product, production quantity of the product, a workload for each working robot according to the product, or a combination thereof. However, it is noted that this is illustrative, and the present disclosure is not necessarily limited thereto.

The collector 121 may collect product production information from a separately provided manufacturing execution system (MES) server, for example. The MES server may provide product production information to the collector 121 as a csv format file. However, it is noted that this is illustrative, and the present disclosure is not necessarily limited thereto.

The collector 121 may provide the collected information to the determination unit 122. The determination unit 122 may perform the following operation based on the collected information.

The determination unit 122 may determine an existing performance schedule in which the repair process of each of the plurality of working robots 110-1, 110-2, . . . , 110-N is performed based on the product production information and the specification information of the working part 111 for each working robot. The determination unit 122 may determine an optimal performance schedule of the repair process for each of the plurality of working robots 110-1, 110-2, . . . , 110-N based on the determined existing performance schedule.

The determination unit 122 may perform the above-described operation based on a predefined model or may perform the above-described operation based on an artificial intelligence (AI) algorithm.

For example, a model capable of preventing waste of necessary members when carrying out the process and preventing an overall cycle time of the process from being delayed may be predefined in the determination unit 122 based on a conditional expression and a function based on a work item for each working robot, work specifications, and specifications of the working part 111.

However, when a model is used, problem complexity exponentially increases depending on the size of input data. Thus, the model has a structure in which it is difficult to reach optimum within a given solution time. As a result, ensuring of an optimal gap of a solution that may be obtained within the time at a desired level (for example, within 5%) is difficult. For example, the optimal gap may mean a value expressed as a ratio of how close an objective equation value of the solution obtained within the solution time is to an objective equation value of the optimal solution, which is described in more detail below with reference to FIG. 3.

Figure 3:
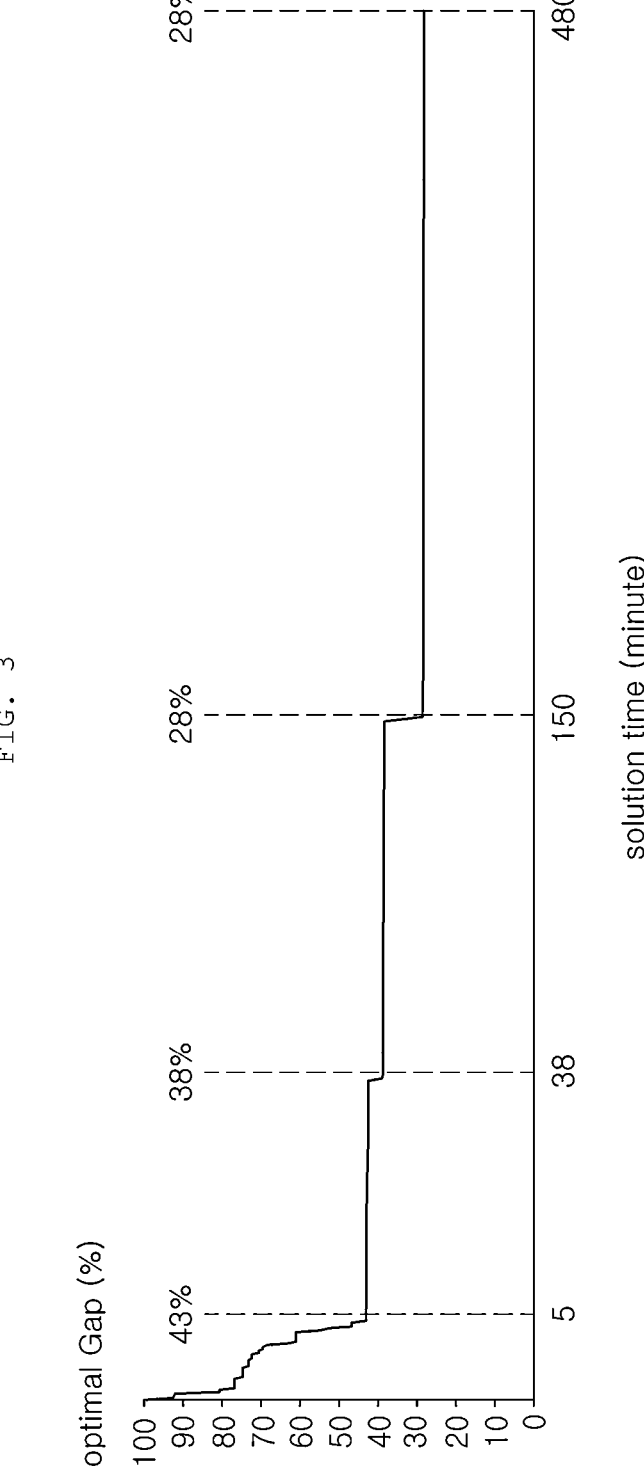
FIG. 3 is a graph for describing a problem of an optimization model derived based on a conditional expression and a function according to an embodiment of the present disclosure.
Figure 8:
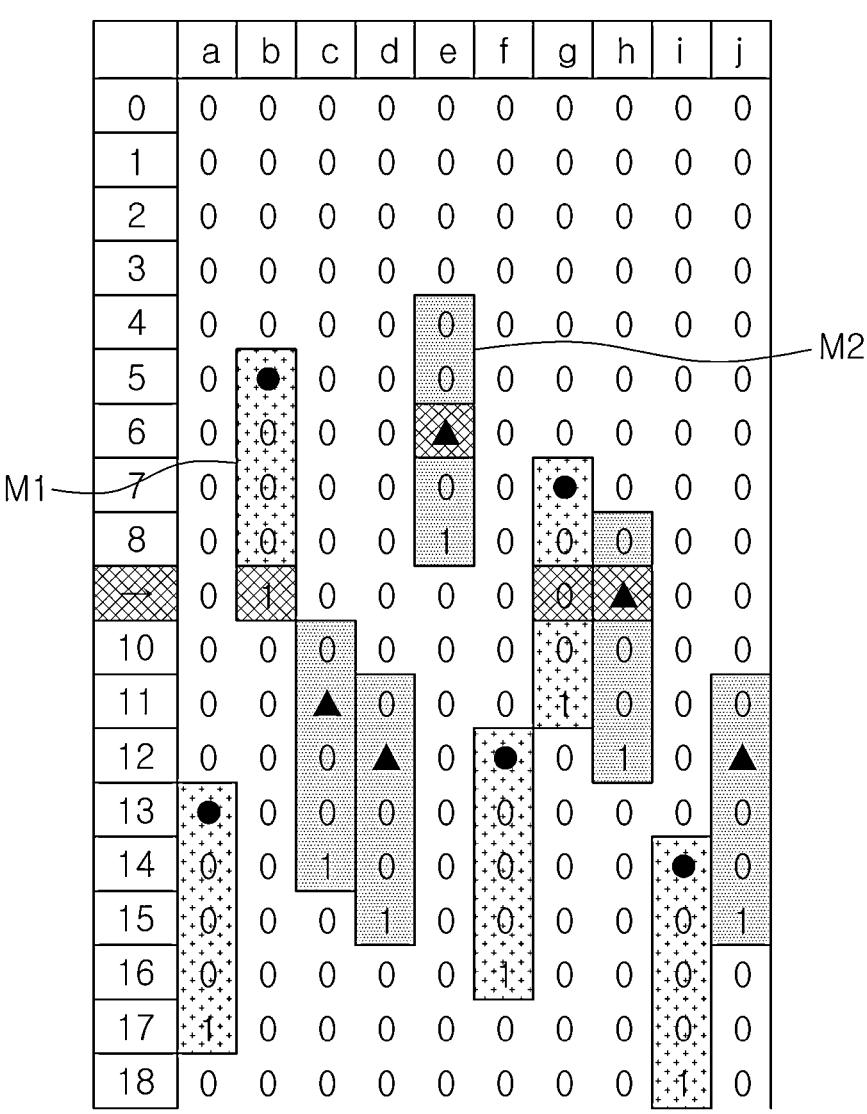

FIG. 3 is a graph for describing a problem of an optimization model derived based on a conditional expression and a function according to an embodiment of the present disclosure.

FIG. 3 is a graph in which an x-axis represents a solution time and a y-axis represents an optimal gap of a solution. More specifically, FIG. 3 depicts a graph in which a problem having 65 working robots and 840 production sequences is assumed and an optimal gap according to a solution time of the problem is depicted.

The smaller optimal gap may mean that the solution obtained from the model is closer to the optimal solution.

However, referring to FIG. 3, it can be seen that it is difficult to significantly improve the optimal gap even when the solution time is set sufficiently long.

In other words, as the size of the input data increases, it may take a lot of time for the solution obtained from the model to be close to the optimal solution.

In addition, communication with the outside may be difficult due to security reasons during factory operation. Accordingly, in order to solve the model, external communication with a server where a solver is installed may be required, which poses operational risks.

Therefore, in order to prevent problems that occur when performing an operation based on the above-described model, in an embodiment of the present disclosure, the determination unit 122 performs the above-described operation based on the AI algorithm.

Returning to FIG. 2, the determination unit 122 may perform an operation based on an AI algorithm that may satisfy both productivity and profitability. Hereinafter, the operation performed by the determination unit 122, according to an embodiment, is described in more detail with reference to FIGS. 4-10.

FIGS. 4-10 are tables for describing a process of determining an optimal performance schedule in the control device, according to an embodiment of the present disclosure.

It is noted that the numerical values disclosed in FIGS. 4-10 are provided merely to describe the operation of the determination unit 122 according to the embodiment of the present disclosure. It is noted that the present disclosure is not limited to the numerical values disclosed in FIGS. 4-10.

First, referring to FIG. 4, the determination unit 122 may determine a workload per time and a maximum workload for each working robot based on the production information of the product and the specification information of the working part 111 for each working robot. The determination unit 122 may determine a performance cycle of the repair process based on the determined workload per time and maximum workload for each working robot. The working part 111 according to an embodiment of the present disclosure may refer to a welding tip. Further, the corresponding working part specification may refer to a diameter of the welding tip. Depending on the diameter of the welding tip, the workload per time and the maximum workload for each working robot may be determined. The maximum workload may mean a maximum workload that may be performed before the repair process of the working part 111 provided in the working robot is performed.

In addition, the determination unit 122 may determine the existing performance schedule of the plurality of working robots 110-1, 110-2, . . . , 110-N based on the determined performance cycle. The existing performance schedule may refer to a schedule that maximizes a usage rate of the working part 111 provided for each working robot.

The determination unit 122 may provide the determined existing performance schedule to the control command unit 123. The control command unit 123 may thus provide a control command to each of the plurality of working robots 110-1, 110-2, . . . , 110-N so that each of the plurality of working robots 110-1, 110-2, . . . , 110-N performs a repair process based on the existing performance schedule.

Each of the plurality of working robots 110-1, 110-2, . . . , 110-N may perform the repair process based on the existing performance schedule during the work process according to the control command delivered from the control command unit 123. Each of the plurality of working robots 110-1, 110-2, . . . , 110-N may provide a performance result of performing the repair process to the control device 120. In an example, the communication unit 124 provided in the control device 120 may receive the performance result of performing the repair process. The communication unit 124 may then provide the received performance result back to the determination unit 122.

The determination unit 122 may determine whether the work process is delayed for each product based on the performance result obtained by the plurality of working robots 110-1, 110-2, . . . , 110-N based on the existing performance schedule. Then, the determination unit 122 may determine an optimal performance schedule of the repair process based on an existing performance schedule of at least one working robot, a work process of which is determined to be delayed, among the plurality of working robots 110-1, 110-2, . . . , 110-N.

In an example, the determination unit 122 may classify the plurality of working robots 110-1, 110-2, . . . , 110-N into a plurality of groups according to a determination as to whether delay occurs. For example, the determination unit 122 may classify the plurality of working robots 110-1, 110-2, . . . , 110-N into a group in which no delay occurs for each product, a group in which delays occur in some products, and a group in which delays occur in all products according to a determination as to whether delay occurs. In an example, at least one working robot may be necessarily included in each of the classified groups.

As described in more detail below with reference to FIGS. 5-10, in an embodiment, the determination unit 122 may determine the optimal performance schedule of the repair process based on an existing performance schedule of at least one working robot classified as the group in which delays occur in some products or the group in which delays occur in all products among the classified groups.

FIG. 5 is a table illustrating an existing performance schedule of at least one working robot classified as the group in which delays occur in some products or the group in which delays occur in all products, according to an embodiment of the present disclosure. A horizontal axis variable in the table may indicate at least one working robot classified as the group in which delays occur in some products or the group in which delays occur in all products. A vertical axis variable in the table may indicate a point in time at which a repair process is performed.

The determination unit 122 may determine a performance time point of the repair process of each of the at least one working robot based on the existing performance schedule of the at least one working robot. Referring to FIG. 5, binary variables of 0 and 1 are defined, where 0 may mean that the repair process is not performed, and 1 may mean that the repair process is performed. However, this is illustrative, and the present disclosure is not limited thereto. The determination unit 122 may determine a point in time when the variable 1 appears in the table of FIG. 5 as a performance time point of the repair process of each of the at least one working robot.

Further, the determination unit 122 may determine a candidate sequence range for at least one working robot based on a preset cycle adjustment value so that the determined performance time point is included in at a last sequence position. For example, referring to a working robot b among the at least one working robot, a performance time point of a repair process is present at a ninth time point, and a candidate sequence range (shaded region) may be set from a fifth time point to a ninth time point based on a preset cycle adjustment value (for example, 5) so that the performance time point is included in at a last sequence position. The above-described example may be equally applied to at least one working robot classified as the group in which delays occur in some products or the group in which delays occur in all products.

The determination unit 122 may determine whether delay of a work process occurs in each candidate sequence position included in the candidate sequence range based on the determined candidate sequence range. According to a determination result, the determination unit 122 may classify candidate sequence ranges determined for at least one working robot into a first case where delays occur in all candidate sequence positions and a second case where there is a candidate sequence position at which no delay occurs. Referring to FIG. 6, the first case may be distinguished and classified by a dotted region and the second case may be distinguished and classified by a shaped region.

The determination unit 122 may determine a reference point serving as a criterion for sequence score calculation for each of the candidate sequence ranges classified as the first case and the second case. For example, the determination unit 122 may determine a time point located at an uppermost time point as a reference point for the first case. The determination unit 122 may also determine a time point corresponding to a latest sequent position in a candidate sequence in which no delay occurs as a reference point for the second case. Referring to FIG. 6, the reference point of the first case may be distinguished by a circle and the reference point of the second case may be distinguished by a triangle. However, this is illustrative, and the present disclosure is not necessarily limited thereto.

The determination unit 122 may determine a candidate sequence range having an earliest sequence position among candidate sequence ranges classified as the first case. The determination unit 122 may calculate a sequence score for each sequence position based on the candidate sequence range.

For example, referring to FIG. 6, there is a candidate sequence range M1 having an earliest sequence position among the candidate sequence ranges classified as the first case. The determination unit 122 may calculate a sequence score for each sequence position existing corresponding to the candidate sequence range M1 based on the candidate sequence range M1. For example, when the candidate sequence range M1 is from the fifth time point to the ninth time point, a sequence score for each sequence position may be calculated based on a candidate sequence of the candidate sequence range included in the corresponding range.

In an example, the score for each sequence position in the candidate sequence range may be assigned so that the score increases as a sequence position is lowered (in other words, a time point is later) starting from the reference point. For example, the score for each sequence position in the candidate sequence range may be assigned as illustrated in FIG. 7. Referring to FIG. 7, when a score for each sequence position is assigned within each candidate sequence range, scores assigned to the same sequence position may be summed to calculate a sequence score for each sequence position. However, this is illustrative, and the present disclosure is not necessarily limited thereto.

The determination unit 122 may determine a sequence position having a highest sequence score among calculated sequence scores. The determination unit 122 may also determine a time point corresponding to the sequence as an optimal performance time point. For example, the determination unit 122 may determine the ninth time point having the highest sequence score among sequence scores calculated for each sequence position with reference to FIG. 7. Further, the determination unit 122 may determine the ninth time point as an optimal performance time point as indicated by a grid region of FIG. 8. Accordingly, at least one working robot having a candidate sequence range at the determined optimal performance time point may perform a repair process at the same time point.

However, there may be a working robot in which a candidate sequence range does not exist at the determined optimal performance time point. In this case, for a candidate sequence range present before the determined optimal performance time point among candidate sequence ranges classified as the first case and the second case, the determination unit 122 may determine a reference point of the candidate sequence range as the optimal performance time point. Accordingly, referring to FIG. 8, for a candidate sequence range M2 present before the determined optimal performance time point (for example, the ninth time point), the determination unit 122 may determine a reference point of the candidate sequence range M2 as the optimal performance time point.

Figure 9:
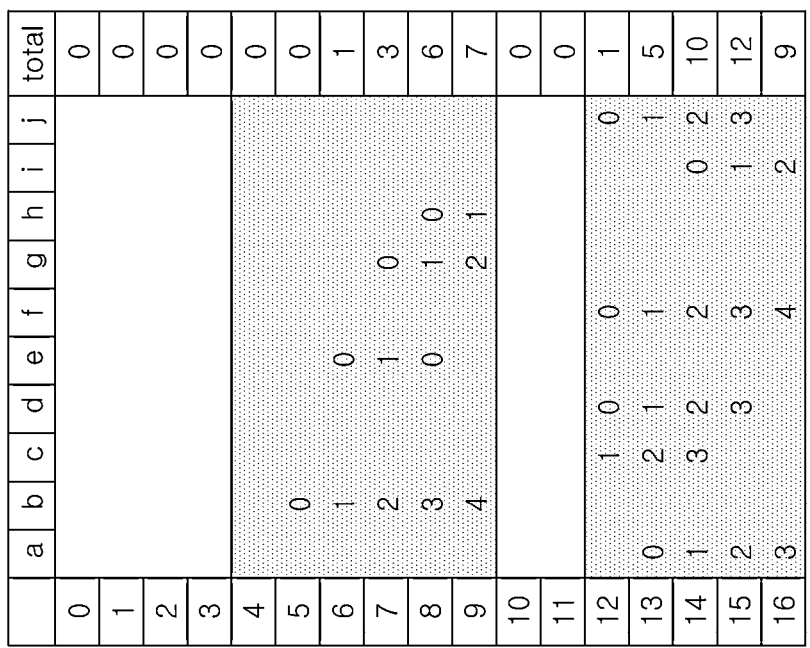

Further, referring to FIG. 9, when the optimal performance time point is determined, the determination unit 122 may determine a candidate sequence range M3 having a next earliest sequence position among the candidate sequence ranges classified as the first case, and may determine a next optimal performance time point based on the candidate sequence range M3. Then, the determination unit 122 may determine an optimal performance time point for every candidate sequence range classified as the first case. In this instance, the determination unit 122 may perform the same process as described above.

For example, referring to FIG. 9, the determination unit 122 may determine the sequence score for each sequence based on the candidate sequence range M3. The determination unit 122 may then determine a 15th time point having the highest sequence score as the optimal performance time point. Additionally, in the case of a candidate sequence range that exists before the determined optimal performance time point, the reference point may be determined as the optimal performance time point.

The determination unit 122 may determine the optimal performance schedule based on the optimal performance time point determined for every candidate sequence range classified as the first case. When the optimal performance schedule is determined, the determination unit 122 may perform a virtual simulation based on the determined optimal performance schedule and may analyze a result obtained through the virtual simulation. For example, the determination unit 122 may determine the optimal performance schedule according to each cycle adjustment value by changing the preset cycle adjustment value for determining the candidate sequence range described above. The determination unit 122 may thus perform the virtual simulation based on the optimal performance schedule determined according to each cycle adjustment value. Then, the result obtained through the virtual simulation may be derived to correspond to each cycle adjustment value.

For example, as shown in FIG. 10, the determination unit 122 may derive result data obtained through the virtual simulation based on the optimal performance schedule to correspond to the cycle adjustment value. The determination unit 122 may store the derived result data in a separately provided memory (not shown). Thereafter, when a cycle adjustment value is set by a factory user, the determination unit 122 may determine an optimal performance schedule corresponding to the set cycle adjustment value so that each of the plurality of working robots 110-1, 110-2, . . . , 110-N may perform the repair process based thereon.

Since a proportion of profitability and productivity improvement effects may change depending on the cycle adjustment value, a working robot may be operated based on an optimal performance schedule corresponding to a selected cycle adjustment value by storing result data derived to correspond to a different cycle adjustment value. Thus, there is an advantage of being able to flexibly take measures according to a purpose of a production operation.

Referring again to FIG. 2, the determination unit 122 may provide the determined optimal performance schedule to the control command unit 123. The control command unit 123 may generate a control command for each of the plurality of working robots 110-1, 110-2, . . . , 110-N to perform the repair process by following the optimal performance schedule. The control command unit 123 may provide the control command to each of the plurality of working robots 110-1, 110-2, . . . , 110-N.

An advantage of using the optimal performance schedule, according to an embodiment, is described in more detail below with reference to FIGS. 11-13.

FIGS. 11-13 are diagrams for describing an effect obtained when a process is performed so that a working robot follows the optimal performance schedule, according to an embodiment of the present disclosure.

FIG. 11 is a table illustrating an existing performance schedule for the plurality of working robots 110-1, 110-2, . . . , 110-N according to an embodiment of the present disclosure. FIG. 12 is a table illustrating an optimal performance schedule for the plurality of working robots 110-1, 110-2, . . . , 110-N, according to an embodiment of the present disclosure.

For example, 0 indicated on the optimal performance schedule of FIGS. 11 and 12 may mean that a repair process is not performed and 2 may mean that a repair process is performed by receiving a repair process command. However, this is illustrative, and the present disclosure is not necessarily limited thereto.

Referring to FIG. 11, when each of the plurality of working robots 110-1, 110-2, . . . , 110-N performs a repair process based on the existing performance schedule, each of the plurality of working robots 110-1, 110-2, . . . , 110-N frequently performs repair processes at various time points.

Thus, there is a disadvantage in that the number of delays in the entire process of producing products increases.

However, referring to FIG. 12, when each of the plurality of working robots 110-1, 110-2, . . . , 110-N performs a repair process based on the optimal performance schedule, some of the plurality of working robots 110-1, 110-2, . . . , 110-N are grouped to perform a repair process. Thus, there is an advantage in that an increase in the number of delays of the entire process may be prevented.

Advantages and disadvantages may be compared based on illustrative values in FIG. 13. FIG. 13 is a table comparing the case where repair processes are collectively performed in the past and the cases where repair processes are performed based on the existing performance schedule and the optimal performance schedule according to an embodiment of the present disclosure.

Referring to FIG. 13, when the repair process is performed based on the existing performance schedule, the number of delays in the entire process may greatly increase due to frequent performance of the repair processes. However, since the working parts 111 provided in the plurality of working robots 110-1, 110-2, . . . , 110-N are used up to the maximum workload, there is an advantage in that the total number of repair processes performed is significantly small. Thus, the number of working parts 111 used may be minimized.

When repair processes were collectively performed in the past, the number of delays in the entire process may have been significantly improved when compared to the case based on the existing performance schedule. However, it can be seen that the total number of repair processes performed would increase. Accordingly, the number of working parts 111 used would also increase.

However, when the repair process is performed based on the optimal performance schedule according to embodiments of the present disclosure, the disadvantages of the two cases described above may be improved, thereby minimizing the number of delays in the entire process and minimizing the total number of repair processes performed. In addition, there is an advantage in that the number of working parts 111 used may be similar to that in the case of performance based on the existing performance schedule.

Each of the plurality of working robots 110-1, 110-2, . . . , 110-N may perform a repair process to follow the optimal performance schedule based on the control command delivered from the control command unit 123 shown in FIG. 2 and may deliver process performance information of the repair process to the control device 120. For example, the process performance information delivered to the control device 120 may include an initial separation distance of the working part 111 determined before the repair process is performed and a corrected separation distance of the working part 111 determined after the repair process is performed.

For example, the repair process according to an embodiment of the present disclosure may be a cutting process or a replacement process of repairing deterioration of the working part 111. In this case, as described in more detail below with reference to FIGS. 14A-14D, the cutting process or the replacement process may be performed when the repair process is performed so that the plurality of working robots 110-1, 110-2, . . . , 110-N follows the optimal performance schedule.

FIGS. 14A-14D are diagrams for describing repair process performance result information of the working part, according to an embodiment of the present disclosure.

When the cutting process is performed in each of the plurality of working robots 110-1, 110-2, . . . , 110-N, the cutting process of the working part 111 may be performed by a cutting device provided to correspond to each of the plurality of working robots 110-1, 110-2, . . . , 110-N. The plurality of working robots 110-1, 110-2, . . . , 110-N may each store and provide performance result information according to performance of the cutting process.

Figure 14A:
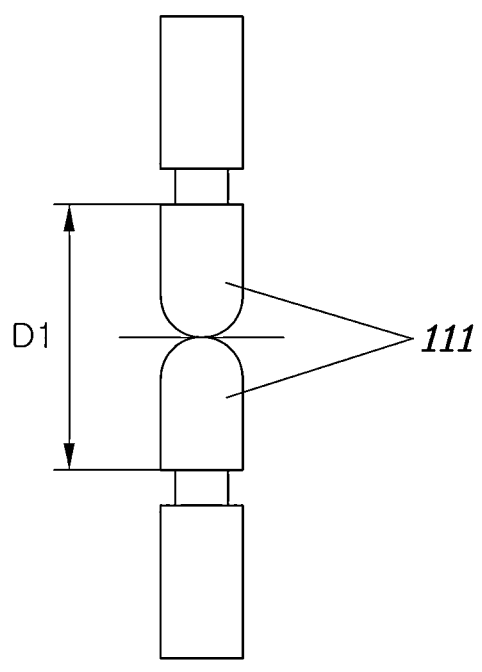
FIGS. 14A-14D are diagrams for describing performance result information of a repair process of a working part, according to an embodiment of the present disclosure.

For example, referring to FIG. 14A, each of the plurality of working robots 110-1, 110-2, . . . , 110-N may determine an initial separation distance D1 of the working part 111 before the cutting process of the working part 111 is performed. In an example, each of the plurality of working robots 110-1, 110-2, . . . , 110-N may make a determination using an encoder provided therein. However, this is illustrative, and the present disclosure is not necessarily limited thereto.

When the cutting process is performed on the working part 111, each of the plurality of working robots 110-1, 110-2, . . . , 110-N may determine a corrected separation distance D2 of the working part 111 after the cutting process is performed.

Each of the plurality of working robots 110-1, 110-2, . . . , 110-N may determine a one-side distance D3 of the working part 111 using a cutting amount checking plate P. In addition, the other-side distance of the working part 111 may be determined based on the determined initial separation distance D1, corrected separation distance D2, and one-side distance D3.

The plurality of working robots 110-1, 110-2, . . . , 110-N may provide result values for the determined distances to the control device 120. The control device 120 may store the result values in a separately provided memory (not shown) as performance result information of the cutting process.

When the replacement process is performed in each of the plurality of working robots 110-1, 110-2, . . . , 110-N, this process may be performed by a separately provided replacement device or manually by an operator. In this instance, in the replacement process, there is a risk of missing or incorrectly installed replacement. Thus, it is necessary to determine whether there is a defect related thereto, which may be determined based on the initial separation distance and the corrected separation distance described above.

Figure 14B:
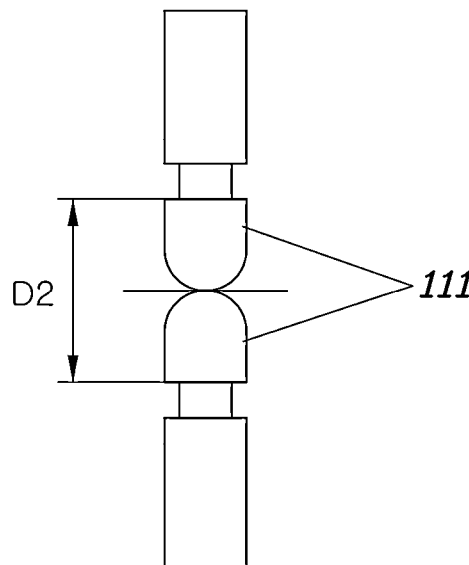
Figure 14C:
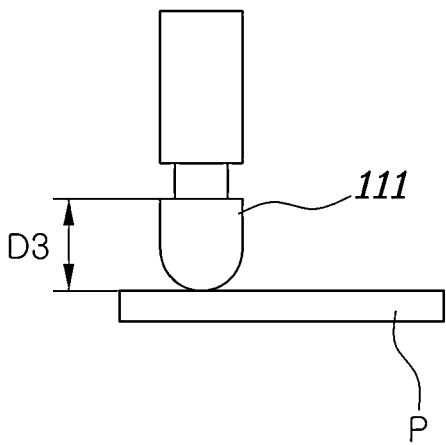

For example, when the replacement process is performed in each of the plurality of working robots 110-1, 110-2, . . . , 110-N, each of the plurality of working robots 110-1, 110-2, . . . , 110-N may determine the initial separation distance of the working part 111 before the replacement process is performed, which may correspond to a situation of FIG. 14B. In an example, each of the plurality of working robots 110-1, 110-2, . . . , 110-N may make a determination using the encoder provided therein. However, this is illustrative, and the present disclosure is not necessarily limited thereto.

Further, when the replacement process is performed on the working part 111, each of the plurality of working robots 110-1, 110-2, . . . , 110-N may determine a corrected separation distance of the working part 111 after the replacement process is performed, which may correspond to a situation of FIG. 14A.

Figure 14D:
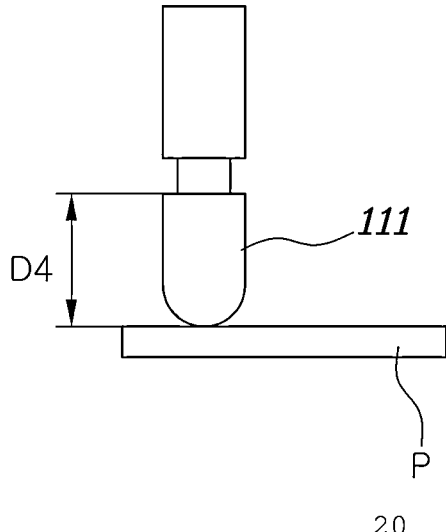

Further, referring to FIG. 14D, each of the plurality of working robots 110-1, 110-2, . . . , 110-N may determine a one-side distance D4 of the working part 111 using the cutting amount checking plate P.

The plurality of working robots 110-1, 110-2, . . . , 110-N may provide result values for the determined distances to the control device 120. The control device 120 may store the result values in a separately provided memory (not shown) as performance result information of the replacement process.

Returning to FIG. 2, the control device 120 may determine the quantity of the repair process of the working part 111 based on a performance result of the cutting process. Further, the control device 120 may determine whether the working part 111 is defective based on the performance result of the replacement process. For example, when the determined one-side distance D4 exceeds a preset reference distance, and the corrected separation distance is greater than the initial separation distance, the control device 120 may determine that the replacement process of the working part 111 is performed without any defect. However, when the determined one-side distance D4 is less than the preset reference distance or the corrected separation distance is less than the initial separation distance, it may be determined that a defect has occurred in the working part 111. Upon determining that a defect has occurred in the working part 111, the process being performed by the corresponding working robot may be suspended.

Additionally, the control device 120 may cause performance results of the repair process including the cutting process and the replacement process to be output. For example, the output unit 125 may cause the performance results of the repair process performed by following the optimal performance schedule in the plurality of working robots 110-1, 110-2, . . . , 110-N to be output. In an example, the output unit 125 may cause the performance results to be output through a separate output device (not shown) linked to the output unit 125. The output device may be, for example, a display device configured to visually or audibly output the performance results. However, this is illustrative, and the present disclosure is not necessarily limited thereto.

When the output unit 125 causes the performance results to be output through the output device, a manager may easily check a current status and the process amount due to the repair process of the working part 111 of each of the plurality of working robots 110-1, 110-2, . . . , 110-N. In this way, it is possible to effectively manage work quality of the plurality of working robots 110-1, 110-2, . . . , 110-N.

The control device 120 may store the determined optimal performance schedule in a separately provided memory and determine whether production information has changed. When the production information has not changed, the control device 120 may control the plurality of working robots 110-1, 110-2, . . . , 110-N so that the repair process is performed by following the stored optimal performance schedule.

When the production information has changed, the control device 120 may update the stored optimal performance schedule based on the changed production information. The control device 120 may then control the plurality of working robots 110-1, 110-2, . . . , 110-N so that the repair process is performed by following the updated optimal performance schedule.

As described above, the control device 120 according to an embodiment of the present disclosure may be a programmable logic controller (PLC) configured to control the plurality of working robots 110-1, 110-2, . . . , 110-N, or may include a counter provided to correspond to each of the plurality of working robots 110-1, 110-2, . . . , 110-N and a control panel configured to control a corresponding working robot by receiving a signal from the counter. However, this is illustrative, and the present disclosure is not necessarily limited thereto.

In addition, one control device 120 according to an embodiment of the present disclosure is equipped with the collector 121, the determination unit 122, the control command unit 123, the communication unit 124, and the output unit 125. However, this is illustrative, and the present disclosure is not necessarily limited thereto. For example, respective components of the control device 120 may be provided in different devices or may be grouped according to roles or functions so that different groups are provided in different devices.

Hereinafter, a working robot operating method according to an embodiment is described with reference to FIGS. 15 and 16 based on the configuration of the working robot operating system described above in FIGS. 1 and 2. A detailed description of each step has been omitted since the detailed description is given in FIGS. 1-14D.

In addition, hereinafter, for convenience of description, it is assumed that respective operations are collectively performed in the control device 120.

Figure 15:
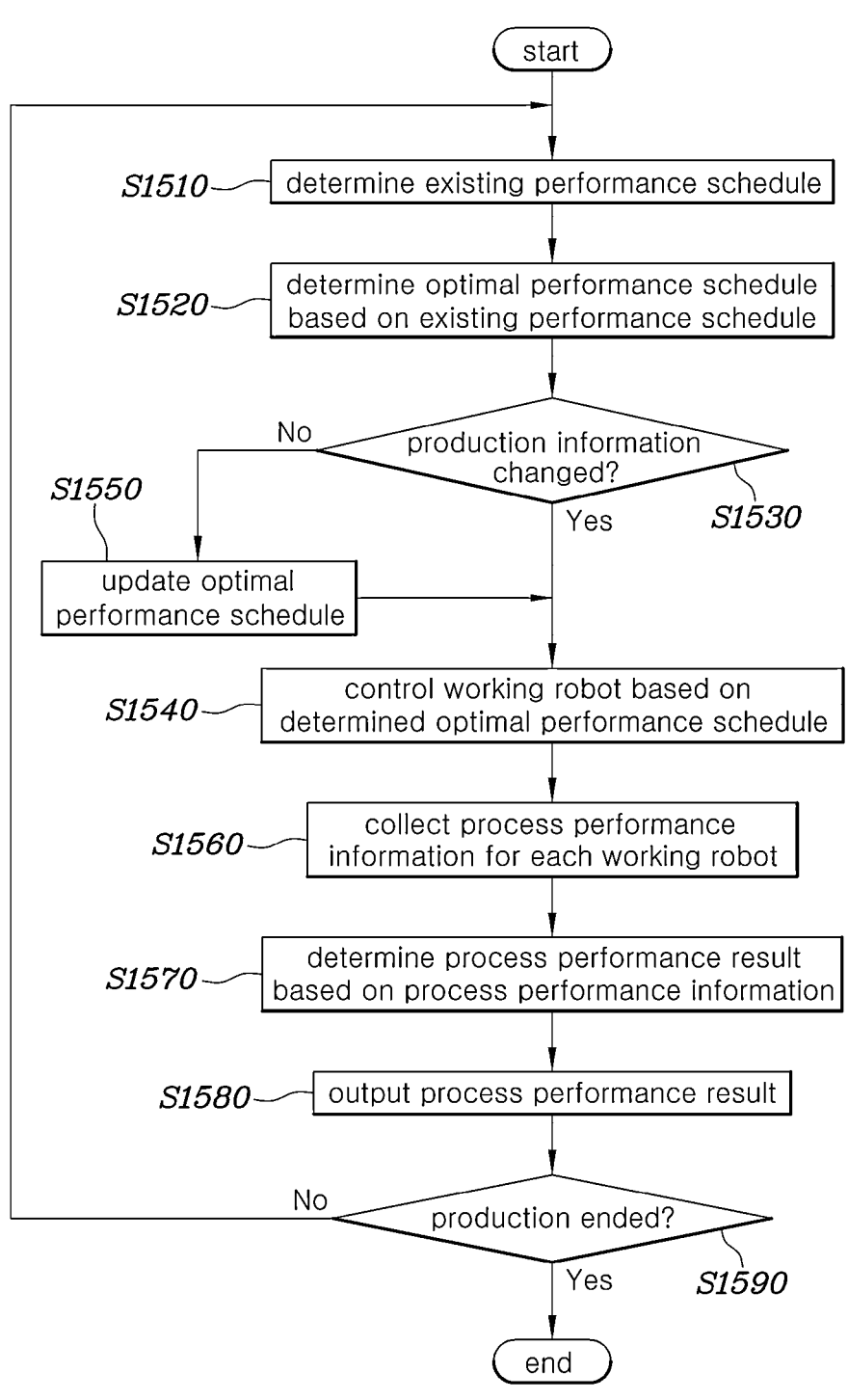
FIGS. 15 and 16 are flowcharts for describing a working robot operating method, according to an embodiment of the present disclosure.
Figure 16:
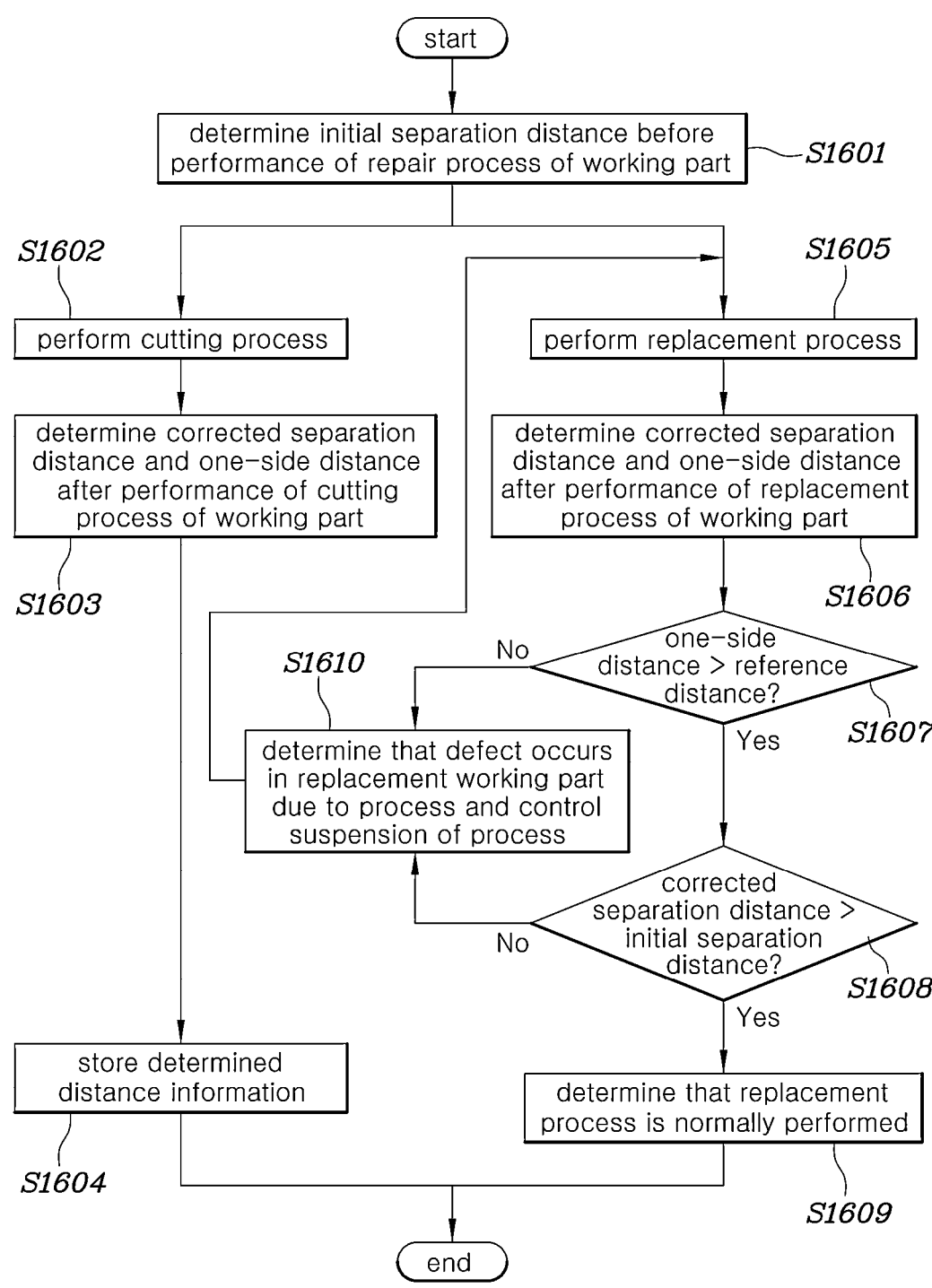

FIGS. 15 and 16 are flowcharts for describing the working robot operating method, according to an embodiment of the present disclosure.

First, referring to FIG. 15, in an operation S1510, the control device 120 may determine an existing performance schedule in which a repair process of each of the plurality of working robots 110-1, 110-2, . . . , 110-N is performed based on production information of a product and specification information of the working part 111 for each working robot.

In an operation S1520, the control device 120 may determine an optimal performance schedule of the repair process for each of the plurality of working robots 110-1, 110-2, . . . , 110-N based on the determined existing performance schedule. The optimal performance schedule may be determined by the process performed in the determination unit 122, which is a component of the control device 120 described above.

After the optimal performance schedule is determined, in an operation S1530, the control device 120 may determine whether the production information of the product has changed. When the production information has not changed (No in operation S1530), the method may proceed to an operation S1540. In operation S1540, the control device 120 may control the plurality of working robots 110-1, 110-2, . . . , 110-N based on the determined optimal performance schedule.

When the production information has changed (Yes in operation S1530), the method may proceed to an operation S1550. In operation S1550, the control device 120 may update the optimal performance schedule based on the changed production information (S1550), and allow the plurality of working robots 110-1, 110-2, . . . , 110-N to be controlled based on the updated optimal performance schedule.

The control device 120 may thus control the plurality of working robots 110-1, 110-2, . . . , 110-N so that the repair process is performed to follow the optimal performance schedule. In an operation S1560, the control device 120 may collect process performance information according to performance of the repair process from the plurality of working robots 110-1, 110-2, . . . , 110-N. In an operation S1570, the control device 120 may determine a process performance result based on the collected process performance information. This process is explained in more detail with reference to FIG. 16. In an operation S1580, the control device 120 may allow the determined process performance result to be output.

In an operation S1590, the control device 120 determines whether production of the product has ended. When the product is still produced (No in the operation S1590), the control device 120 may repeatedly perform operations S1510-S1580 described above.

Next, step S1570 of FIG. 15 is described in detail with reference to FIG. 16.

Referring to FIG. 16, in an operation S1601, each of the plurality of working robots 110-1, 110-2, . . . , 110-N may determine the initial separation distance before performance of the repair process of the working part 111.

In addition, the repair process according to an embodiment of the present disclosure may be divided into a cutting process and a replacement process, and each process is separately described below.

First, when the cutting process of the working part 111 is performed in an operation S1602, each of the plurality of working robots 110-1, 110-2, . . . , 110-N may determine a corrected separation distance and a one-side distance after performance of the cutting process of the working part 111 in an operation S1603. Each of the plurality of working robots 110-1, 110-2, . . . , 110-N may provide determined distance information to the control device 120 as process performance information. In an operation S1604, the control device 120 may store the received distance information in a separately provided memory.

When the replacement process of the working part 111 is performed in an operation S1605, each of the plurality of working robots 110-1, 110-2, . . . , 110-N may determine a corrected separation distance and a one-side distance after performance of the replacement process of the working part 111 in an operation S1606. Each of the plurality of working robots 110-1, 110-2, . . . , 110-N may provide determined distance information to the control device 120 as process performance information.

In an operation S1607, the control device 120 may determine whether the determined one-side distance exceeds a preset reference distance based on the process performance information. When the one-side distance exceeds the preset reference distance (Yes in operation S1607), the control device 120 may determine whether the corrected separation distance is greater than the initial separation distance in an operation S1608.

When the one-side distance exceeds the reference distance (Yes in operation S1607), and the corrected separation distance is greater than the initial separation distance (Yes in operation S1608), the control device 120 may, in an operation S1609, determine that the replacement process for the working part 111 has been normally performed.

However, when the one-side distance is less than or equal to the reference distance (No in operation S1607), or the corrected separation distance is less than or equal to the initial separation distance (No in operation S1608), the control device 120 may, in an operation S1610, determine that a defect has occurred in the working part 111 due to the replacement process, and perform a control operation so that the process of the corresponding working robot is suspended.

According to embodiments of the present disclosure, the working robot operating system and method control a plurality of working robots so that repair work is performed based on an optimal performance schedule, thereby preventing waste of working parts since the repair work is performed at an appropriate time.

Additionally, by controlling a plurality of working robots so that repair work is performed based on an optimal performance schedule, an overall cycle time may be prevented from being delayed due to the repair work and productivity may be improved.

In addition, by outputting a performance result of performing repair work based on an optimal performance schedule, real-time monitoring is possible and problems caused by a defect of the repair work may be prevented.

The effects obtainable by the present disclosure are not limited to the effects mentioned above. Other effects not mentioned herein may be clearly understood by those having ordinary skill in the art from the above description.

Even though the present disclosure has been illustrated and described in relation to specific embodiments, it should be apparent to those having ordinary skill in the art that the present disclosure may be improved and changed in various ways without departing from the technical spirit of the present disclosure as provided by the following claims.

The present disclosure described above may be implemented as computer-readable code on a program-recorded medium. The computer-readable medium includes all types of recording devices that store data readable by a computer system. Examples of the computer-readable medium include an HDD (Hard Disk Drive), an SSD (Solid State Drive), an SDD (Silicon Disk Drive), a ROM, a RAM, a CD-ROM, a magnetic tape, a floppy disk, an optical data storage device, etc.

The above detailed description should not be construed as restrictive in all respects and should be considered illustrative. The scope of the present disclosure should be determined by reasonable interpretation of the appended claims. All changes within the equivalent scope of the present disclosure are included in the scope of the present disclosure.

What is claimed is:

1. A working robot operating system comprising:
   a plurality of working robots each configured to perform a work process involving deterioration of a working part and a repair process of repairing the deterioration of the working part; and
   a control device configured to
      determine an existing performance schedule in which the repair process of each of the plurality of working robots is performed based on production information of a product and specification information of a working part for each working robot,
      perform a control operation so that each of the plurality of working robots performs the repair process based on the determined existing performance schedule,
      determine whether the work process is delayed for each product for each of the plurality of working robots based on a performance result of the repair process performed by each of the plurality of working robots,
      determine an optimal performance schedule of the repair process for each of the plurality of working robots based on the determined existing performance schedule of at least one working robot, the work process of which is determined to be delayed, among the plurality of working robots, and
      control the plurality of working robots so that the repair process is performed by following the determined optimal performance schedule.

2. The working robot operating system according to claim 1, wherein the control device is configured to:
   determine a performance cycle of the repair process based on the production information and the specification information; and
   determine the existing performance schedule based on the determined performance cycle.

3. The working robot operating system according to claim 2, wherein the control device is configured to:

determine a workload per time and a maximum workload for each working robot based on the production information and the specification information; and determine the performance cycle based on the determined workload per time and the maximum workload for each working robot.

4. The working robot operating system according to claim 1, wherein the control device is configured to:

classify the plurality of working robots into a group in which no delay occurs for each product, a group in which delays occur in some products, and a group in which delays occur in all products based on the determination as to whether the work process is delayed; and determine the optimal performance schedule based on an existing performance schedule of at least one working robot classified as the group in which delays occur in some products or the group in which delays occur in all products among the classified groups.

5. The working robot operating system according to claim 1, wherein the control device is configured to:

determine a performance time point of the repair process of the at least one working robot based on the existing performance schedule;

determine a candidate sequence range for the at least one working robot based on a cycle adjustment value preset so that the determined performance time point is included at a last sequence position; and determine the optimal performance schedule based on the determined candidate sequence range.

6. The working robot operating system according to claim 5, wherein the control device is configured to:

determine whether the work process is delayed in each of candidate sequence positions included in the candidate sequence range;

classify the determined candidate sequence range into a first case where delays occur in all the candidate sequence positions and a second case where there is a candidate sequence position at which no delay occurs; and determine the optimal performance schedule based on a candidate sequence range having an earliest sequence position among candidate sequence ranges classified as the first case.

7. The working robot operating system according to claim 6, wherein the control device is configured to:

determine a reference point serving as a criterion for sequence score calculation for each of candidate sequence ranges classified as the first case and the second case;

calculate a sequence score for each sequence position based on the candidate sequence range having the earliest sequence position;

determine a time point corresponding to a sequence position having a highest sequence score among calculated sequence scores as an optimal performance time point; and determine the optimal performance schedule based on the determined optimal performance time point.

8. The working robot operating system according to claim 7, wherein, the control device is configured to, after the optimal performance time point is determined, determine a next optimal performance time point based on a candidate sequence range having a next earliest sequence position among the candidate sequence ranges classified as the first case.

9. The working robot operating system according to claim 7, wherein, the control device is configured to, for a candidate sequence range present before the determined optimal performance time point in the first case and the second case, determine a reference point of the candidate sequence range as the optimal performance time point.

10. The working robot operating system according to claim 1, wherein the control device is configured to:

receive process performance information obtained by performance of the plurality of working robots following the optimal performance schedule; and determine a process performance result based on the received process performance information and cause the process performance result to be output.

11. The working robot operating system according to claim 10, wherein the control device is configured to determine a process performance result including at least one of information on a quantity of the repair process of the working part or information as to whether repair of the working part is defective based on the process performance information.

12. The working robot operating system according to claim 1, wherein the control device is configured to:

store the determined optimal performance schedule;

determine whether the production information has changed; and control the plurality of working robots so that the repair process is performed by following the stored optimal performance schedule when the production information has not changed.

13. The working robot operating system according to claim 12, wherein the control device is configured to:

update the stored optimal performance schedule in consideration of changed production information when the production information is changed; and control the plurality of working robots so that the repair process is performed by following the updated optimal performance schedule.

14. The working robot operating system according to claim 1, wherein the control device is a programmable logic controller (PLC) configured to control the plurality of working robots.

15. The working robot operating system according to claim 1, wherein the control device includes:

a respective counter provided to correspond to each of the plurality of working robots; and a control panel configured to control a working robot by receiving a signal from a corresponding counter.

16. The working robot operating system according to claim 1, wherein:

the working part comprises a welding tip;

the work process is a welding process; and the repair process is an auto tip dressing (ATD) process.

17. A working robot operating method, comprising:

determining, by a control device, an existing performance schedule in which a repair process of repairing deterioration of a working part of each of a plurality of working robots configured to perform a work process involving deterioration of the working part is performed based on production information of a product and specification information of a working part for each working robot;

performing, by the control device, a control operation so that each of the plurality of working robots performs the repair process based on the determined existing performance schedule;

determining, by the control device, whether the work process is delayed for each product for each of the plurality of working robots based on a performance result of the repair process performed by each of the plurality of working robots;

determining, by the control device, an optimal performance schedule of the repair process for each of the plurality of working robots based on the determined existing performance schedule of at least one working robot, the work process of which is determined to be delayed, among the plurality of working robots; and controlling, by the control device, the plurality of working robots so that the repair process is performed by following the determined optimal performance schedule.

18. The working robot operating method according to claim 17, further comprising:

determining, by the control device, a process performance result including at least one of information on a quantity of the repair process of the working part and information as to whether repair of the working part is defective based on process performance information obtained by performance of the plurality of working robots following the optimal performance schedule after the controlling; and outputting, by the control device, the process performance result.

\* \* \* \* \*